United States Patent

Basinger

[11] Patent Number: 5,887,746
[45] Date of Patent: Mar. 30, 1999

[54] HIGH VACUUM HOUSING WITH IMPROVED SEALING MEANS

[75] Inventor: Thomas J. Basinger, Ypsilanti, Mich.

[73] Assignee: Pilot Industries, Inc., Dexter, Mich.

[21] Appl. No.: 976,785

[22] Filed: Nov. 24, 1997

[51] Int. Cl.[6] .................................................. B65D 53/00
[52] U.S. Cl. ........................................ 220/327; 220/310.1
[58] Field of Search ..................................... 220/327, 344, 220/803, 804, 806, 310.1

[56] References Cited

U.S. PATENT DOCUMENTS

| | | | |
|---|---|---|---|
| 3,270,910 | 9/1966 | Lusk | 220/327 |
| 3,317,072 | 5/1967 | Zavertnik et al. | 220/327 |
| 3,460,710 | 8/1969 | Vogeli | 220/327 |
| 3,655,090 | 4/1972 | Rothrock et al. | 220/327 |
| 3,951,300 | 4/1976 | Kalasek | 220/327 |
| 5,050,764 | 9/1991 | Voss | 220/327 |
| 5,560,511 | 10/1996 | McNerney | 220/327 |

Primary Examiner—Joseph M. Moy
Attorney, Agent, or Firm—Gifford, Krass, Groh, Sprinkle, Anderson & Citkowski, P.C.

[57] ABSTRACT

A high vacuum housing with a first and second housing part and in which the housing parts are secured together to form an interior housing chamber. In order to seal the housing parts, an annular outwardly extending sealing ring having a flat radial surface is formed on one of the housing parts. An annular alignment recess is formed on the other housing part which registers with and receives the alignment ring. A thin walled seal is disposed between the housing parts. When the housing parts are secured together by bolts, an outer periphery of the seal is compressibly sandwiched between the flat radial surface on the sealing ring and the flat surface on the second housing part thus sealing the window to the housing.

3 Claims, 2 Drawing Sheets

5,887,746

HIGH VACUUM HOUSING WITH IMPROVED SEALING MEANS

BACKGROUND OF THE INVENTION

I. Field of the Invention

The present invention relates generally to high vacuum housings and, more particularly, to such a housing having novel means for sealing an interior chamber of the housing.

II. Description of the Prior Art

High vacuum housings, such as housings for x-ray sources of the type used both for medical applications as well as for material inspection devices, typically comprise two parts which are detachably secured together and form an interior chamber.

Maintaining a high vacuum within the housing chamber has presented unique challenges. For example, common elastomeric seals are inappropriate for such housings since outgassing from such seals would adversely affect the vacuum contained within the housing chamber.

Consequently, in order to sealingly secure the housing parts together, it has been the previously known practice to position an annular ring constructed of a malleable material, such as copper, in between the housing parts. The annular seal ring, furthermore, is relatively thick, e.g. 1/16 of an inch in thickness.

In order to complete the seal between the housing parts and the annular ring, the previously known high vacuum housings typically include sawtooth shaped annular projections and recesses. Thus, when the housing parts are clampingly secured together, typically by bolting the housing parts together, the sawtooth rings on the housing parts extrude the sealing ring between the projections and recesses thus sealing the housing parts together.

A major disadvantage of these previously known housings is that, in order to ensure that the sealing ring is evenly and sealingly extruded between the housing parts, the housing parts are necessarily massive in construction to prevent warpage or distortion of the housing parts as the ring is extruded. Furthermore, in order to apply the compressive force between the housing parts necessary to properly extrude the sealing ring between the housing parts, it has been previously necessary to provide a plurality of circumferentially spaced, large bolts between the housing parts. These bolts are sequentially tightened thus drawing the housing parts together and extruding the seal ring. Consequently, the assembly of the housing is not only tedious and time consuming, but also results in increased material costs due to the massive construction required for the housing parts.

SUMMARY OF THE PRESENT INVENTION

The present invention provides a high vacuum housing which overcomes all of the above mentioned disadvantages of the previously known devices.

In brief, the housing of the present invention comprises first and second housing parts. The housing parts are secured together so that the housing parts form an interior housing chamber.

A thin seal is disposed between the housing parts entirely around the housing chamber. The seal is thin walled, i.e. less than 0.020 inches and preferably substantially 0.010 inches, and constructed of a material, such as aluminum, that is not subject to outgassing.

In order to seal the housing parts together, the first housing part includes an annular outwardly extending sealing ring having a predetermined inside diameter and having a flat radial surface. An annular alignment ring is also formed on the first housing part coaxially around the sealing ring. An annular recess is formed on the other housing part and this recess registers with and slidably receives the alignment ring. The seal is positioned between the housing parts in alignment with the sealing ring. When the housing parts are secured together, the seal is subjected to a compressive force between the sealing ring and a flat surface on the second housing part thus sealing the housing parts together. Furthermore, as the housing parts are secured together, the alignment ring and its mating recess not only maintain the alignment of the housing parts, but also protect the outer periphery of the seal.

Since the medium which also forms a seal is relatively thin, the previously known massive construction for the housing is unnecessary. Accordingly, relatively small bolts can be used to secure the housing together without fear of deformation of the housing, and thus adversely affecting the integrity of the seal, during assembly of the housing.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
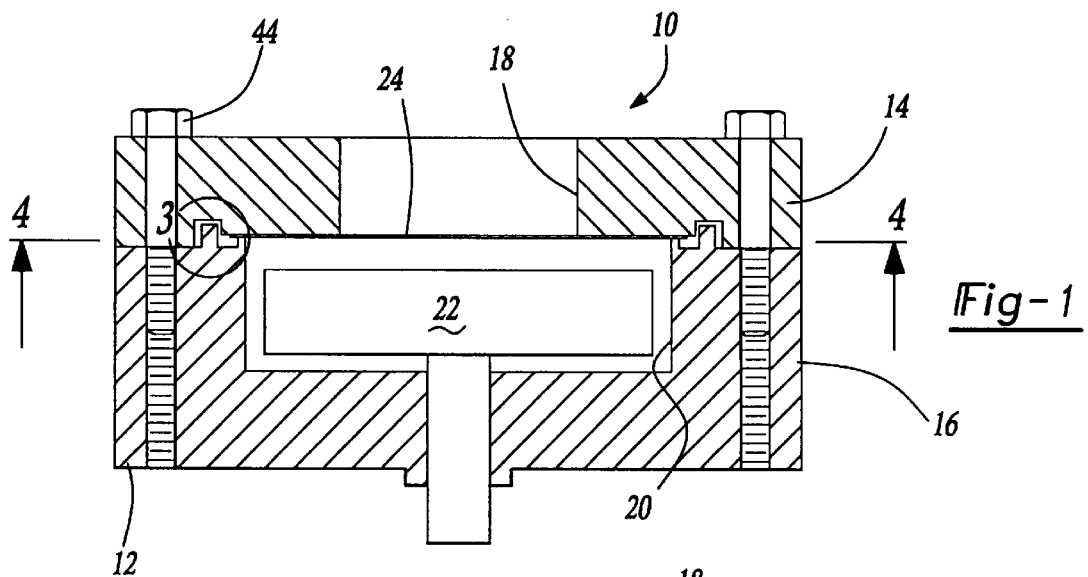
FIG. 1 is a sectional view illustrating a preferred embodiment of the present invention in an assembled condition.
Figure 4:
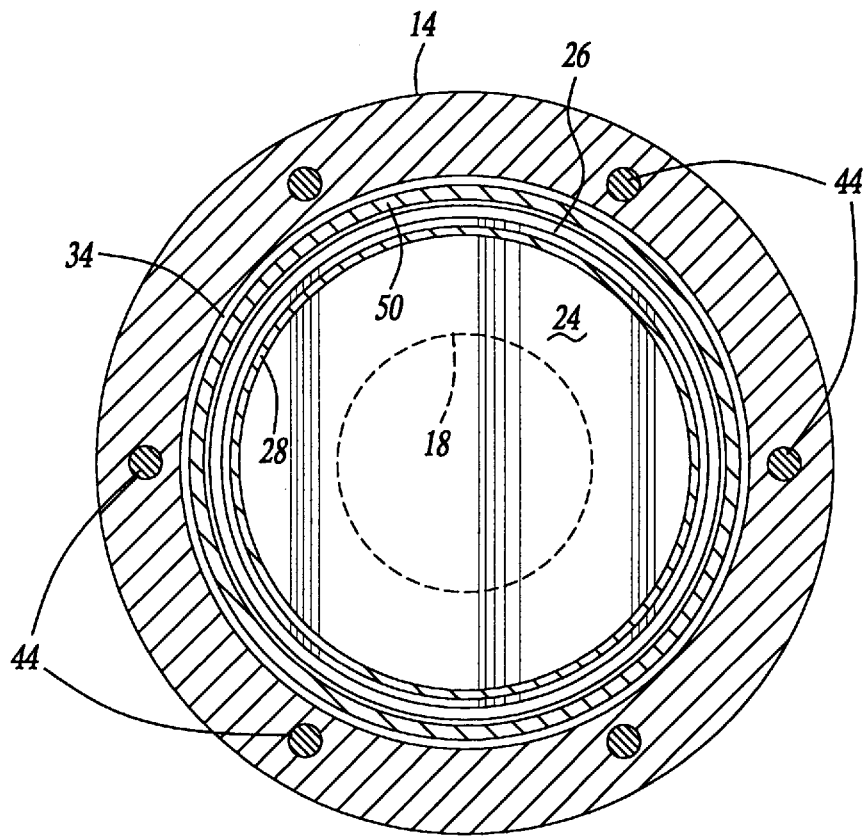
FIG. 4 is a sectional view taken along line 4—4 in FIG. 1.

With reference first to FIGS. 1 and 4, a preferred embodiment of the high vacuum housing 12 is there shown. The housing will be described as a housing for an x-ray source 10. However, it will be understood that no limitation of the invention should be inferred and that the present invention may be used in any type of high vacuum housing.

The housing 12 comprises a first part 14 and a second part 16. Each housing part 14 and 16 is generally cylindrical in construction and the housing part 14 optionally includes a cylindrical opening 18 formed through it. The housing parts 14 and 16, furthermore, form an interior chamber 20 when the housing parts 14 and 16 are axially secured together.

Figure 2:
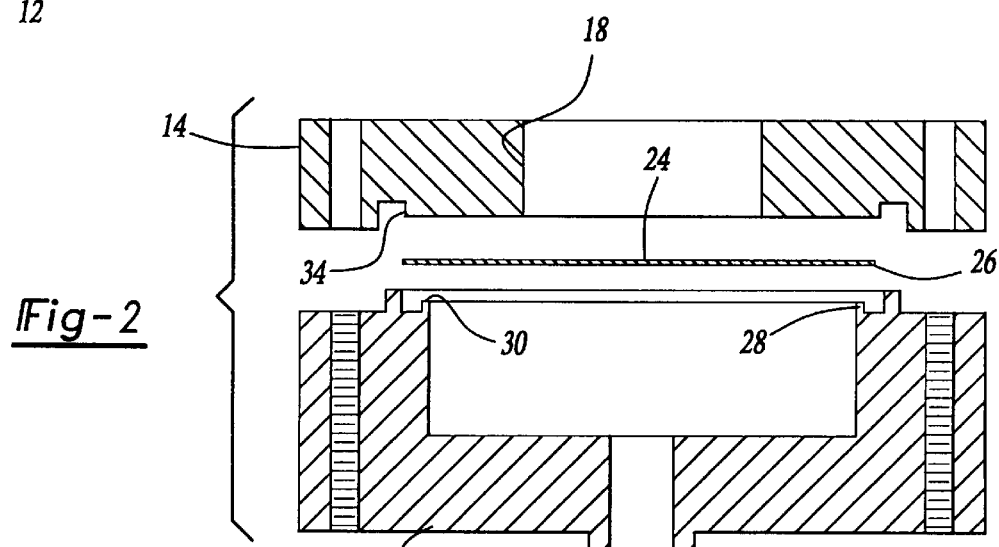
FIG. 2 is an exploded cross sectional view illustrating the preferred embodiment of the present invention.

Referring now to FIGS. 2 and 4, in order to maintain the housing chamber 20 at or near an absolute vacuum, a generally circular seal 24 constructed of non-outgassing material, such as aluminum, is disclosed entirely across the opening 18, if present. An outer periphery 26 of the seal 24 also overlies a portion of the junction of the housing parts 14 and 16 for a reason to be shortly described. Furthermore, the seal 24 is very thin in construction, i.e. less than 0.020 inches in thickness and preferably substantially 0.010 inches in thickness.

In the event the housing 12 does not have an opening 18, the seal 24 may be annular in shape.

Figure 3:
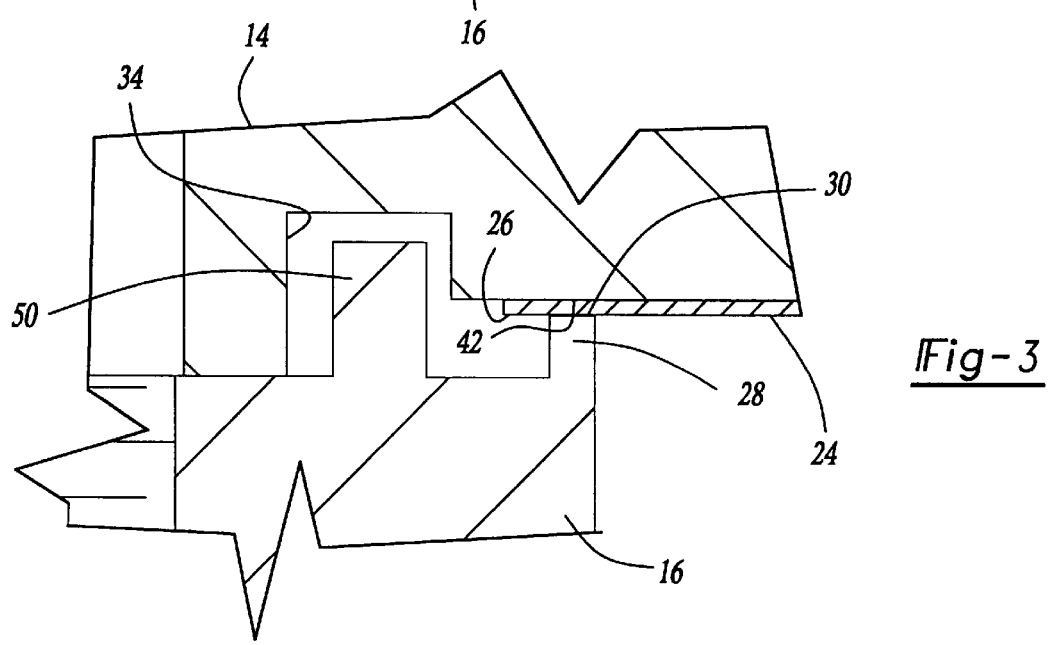
FIG. 3 is a view taken around circle 3—3 in FIG. 1 and enlarged for clarity.

Referring now particularly to FIG. 3, in order to seal the housing parts 14 and 16 together, the second housing part 16 includes an annular axially outwardly extending sealing ring 28 preferably integrally formed with the second housing part 16. The sealing ring 28, furthermore, has a radial width of 0.01–0.05 inches which terminates in an outer flat radially extending surface 30.

An outwardly extending alignment ring 50 extends outwardly from the second housing part 16 coaxially around the sealing ring 28. The alignment ring 50 is also preferably integrally formed with the second housing part 16.

Still referring to FIGS. 2 and 3, the first housing part 14 includes an annular recess 34 which registers with the alignment ring 50. The recess 34 is dimensioned to axially slidably receive the alignment ring 50 and also protects the outer periphery of the seal 24. A flat radially extending surface 42 on the first housing part faces the flat outer surface 30 of the sealing ring 28.

Referring now to FIGS. 1–3, in order to assemble the housing 12 together, the seal 24 is positioned between the housing parts 14 and 16 so that the seal 24 overlaps the flat surface 30 of the sealing ring 28. The alignment ring 50 is partially positioned within its recess 34 thus maintaining the alignment of the housing parts 14 and 16. The housing parts 14 and 16 are then axially secured together by bolts 44 (FIG. 1) which, upon tightening, sealingly compresses the seal 24 between the outer surface 30 of the sealing ring 28 and the flat surface 42 of the housing part 14. The alignment ring 50 also protects the outer periphery 26 of the seal 24.

A primary advantage of applicant's invention is that, due to the relatively thin seal, massive construction of the housing parts 14 and 16 is no longer required in order to prevent warpage or distortion of the housing parts during the assembly process. Furthermore, relatively small bolts 44 may be utilized to secure the housing parts 14 and 16 together thus further reducing the overall costs of the housing 12.

From the foregoing, it can be seen that the present invention provides a novel construction for a high vacuum housing which overcomes many of the disadvantages of the previously known devices. Having described my invention, however, many modifications thereto will become apparent to those skilled in the art to which it pertains without deviation from the spirit of the invention as defined by the scope of the appended claims.

I claim:

1. A high vacuum housing assembly comprising:

a first housing part and a second housing part, said first housing part having a circular sealing ring with a flat outer axial end, means for securing said housing parts together so that said housing parts form an interior chamber and so that said axial end of said sealing ring registers with a flat annular surface on said second housing part, a continuous circular disk constructed of a non-outgassing material disposed between said housing parts so that said disk overlies said sealing ring and so that an outer periphery of said disk protrudes radially outwardly from an outer periphery of said seal ring, said disk having a thickness of less than 0.05 inches, means for compressibly securing said housing parts together.

2. The invention as defined in claim 1 wherein said disk has a thickness of substantially 0.02 inches.

3. The invention as defined in claim 1 and comprising an alignment ring disposed coaxially around said sealing ring, said alignment ring registering with an annular recess on the other housing part.

* * * * *